June 24, 1941.  L. N. HAMPTON ET AL  2,246,585

SOLDERING COPPER STAND

Filed July 19, 1939

INVENTORS: *L.N. HAMPTON*
*A.H. SHANGLE*

BY J. MacDonald

ATTORNEY

Patented June 24, 1941

2,246,585

UNITED STATES PATENT OFFICE 2,246,585

SOLDERING COPPER STAND

Leon N. Hampton, New York, N. Y., and Amos H. Shangle, Roselle, N. J., assignors to Bell Telephone Laboratories, Incorporated, New York, N. Y., a corporation of New York Application July 19, 1939, Serial No. 285,460

1 Claim. (Cl. 248—346)

This invention relates to soldering coppers and more specifically to a stand device used for supporting the heat transferring end of a soldering copper at a distance from the table or the working bench on which the soldering copper may be placed.

The object of the invention is the provision of a stand of the type above referred to, which will be simple in construction, cheap to manufacture and reliable in operation.

In accordance with this invention, a stand device for a soldering copper is provided in which a base in cooperation with a peripherally disposed ridge formed therewith afford a recess for concealing a soldering copper support when this support is in its unoperated position. Means in the ridge is provided for pivotally mounting the support, while camming elements formed with the ridge at the adjacently disposed end of the bearing portions are effective to cause the tensioning of the support when this support is manually moved from its normal horizontal position toward an upright position, the cams having portions permitting the release of the support at a point substantially perpendicular relative to the base to cause its continued movement automatically against stops which determine the operated position of such support, the support in turn being formed to furnish combined means for manually moving it in its movement toward the cams and to furnish a rest for the soldering copper when in its operated position following its automatic movement against the stops.

Other novel features and advantages of the invention will appear from the following description and by the claim appended thereto, reference being had to the accompanying drawing in which:

Figure 1:
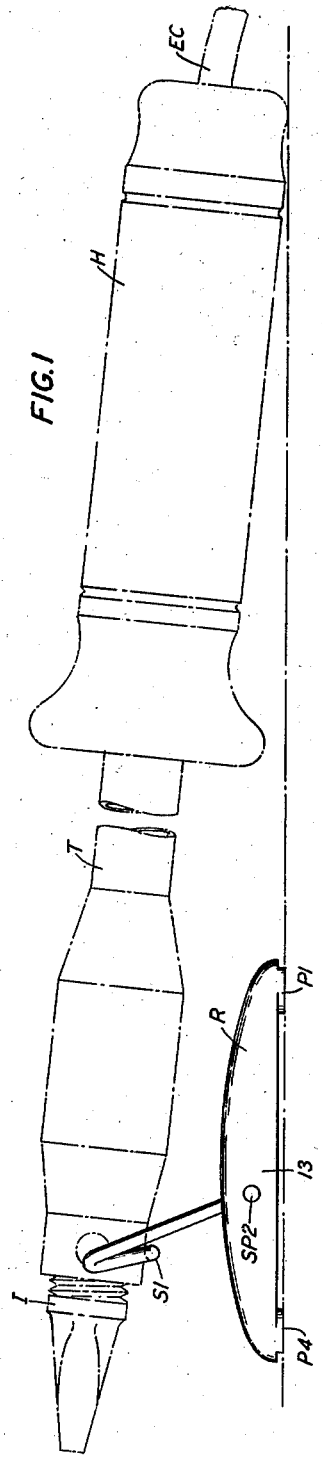
Fig. 1 is a side view of the stand shown with a soldering copper in position thereon, the soldering copper being shown diagrammatically.

The soldering copper with which the stand device of this invention is particularly well adapted for use consists as shown diagrammatically in Fig. 1 of a handle H, a tubular support T, a heat transferring tip I, a heating element (not shown) in the tubular support and an electric cord EC connecting an electrical source to the heating element.

Figure 2:
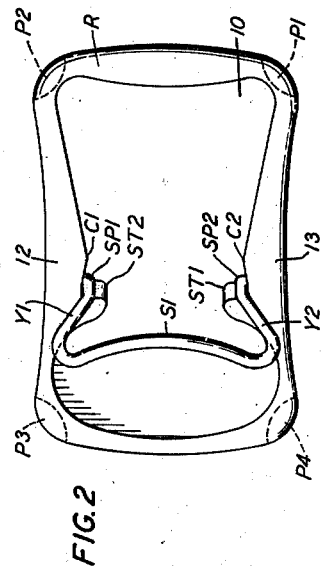
Fig. 2 is a top view with the support moved in its operated position.
Figure 3:
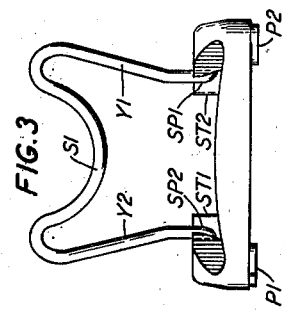
Fig. 3 is an end view of Fig. 2.

The stand device consists of a substantially rectangular base 10 of aluminum or phenol plastic material, formed with a peripherally disposed ridge R of increasing thickness at its middle length portion to form bearings 12 and 13 for pivotally mounting a support made preferably of a piece of spring wire bent to form the spindle portions SP1 and SP2, the arms Y1 and Y2 and a semicircular portion SI for receiving the soldering copper as, for example, the end of the tubular support adjacent the heat transferring tip when this support is moved in the position as shown in Figs. 1, 2 and 3 as will be hereinafter described in detail.

Figure 5:
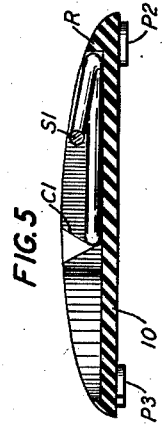
Fig. 5 is a longitudinal cross-sectional view taken on line 5—5 of Fig. 4.
Figure 4:
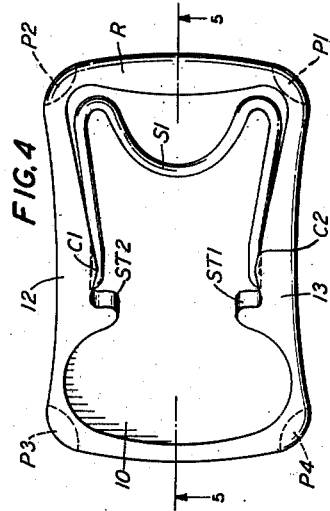
Fig. 4 is a top view shown with the support in normal position.

The ridge R as shown in Fig. 5 in cooperation with the base 10 forms a recess into which the wire support is located when in its normal position and at the adjacently disposed ends of the bearing portions 12 and 13 is formed with camming portions C1 and C2 which, when the wire support is moved manually from normal position shown in Figs. 4 and 5, to an upright position of substantially 80 degrees, the camming portions C1 and C2 cause the tensioning of the wire support which, under the medium of its own resiliency and the coaction of its arms Y1 and Y2 with the cams, is then caused to continue such pivotal movement automatically to a point substantially 110 degrees from the plane of the base 10 in abutment against the stop elements ST1 and ST2 formed with the peripheral ridge R, where it is resiliently held and thereby effectively prevented from accidental movement toward its normal position parallel to the base 10, that is, into the recess formed by the ridge and the base. Upon the manual movement of the wire support from its operated position to its folder position in the recess formed by the ridge R, this wire support is held in such position by the normal tension of the arms Y1 and Y2 engaging the lower portions of cams C1 and C2 as shown in dotted lines in Fig. 4, thus facilitating the carrying and handling of the stand device when not in use.

The portion SI of the wire support as shown in Fig. 1 is offset from the plane of arm portions Y1 and Y2 to further hold the wire support against stops ST1 and ST2 under the gravity of the soldering copper while furnishing a hold or handle above the surface of the base 10 so as to facilitate the initial manual pivotal movement of the support.

The base 10 is provided on its under-side with four projections P1, P2, P3 and P4 for heat insulating this base 10 from the table or the bench on which it may be placed and when constructed of phenol plastic material a coat of aluminum paint is applied thereto so as to reflect the heat from the heat transferring tip as generated by the heating element.

It is understood that minor changes may be made to the device of the invention without departing from the scope of the appended claim.

What is claimed is:

A soldering copper stand comprising a cast base having a peripherally disposed ridge and oppositely disposed bearing portions in said ridge, a substantially M-shaped wire support for the soldering copper pivotally mounted in said bearings for movement from a position parallel to said base to an upright position, said support being tensioned outwardly, stop elements formed with said base and camming members for tensioning said support upon said movement to cause the automatic pivotal movement of said support from said upright position to a point against said stop elements.

LEON N. HAMPTON.
AMOS H. SHANGLE.